Patented Feb. 27, 1934

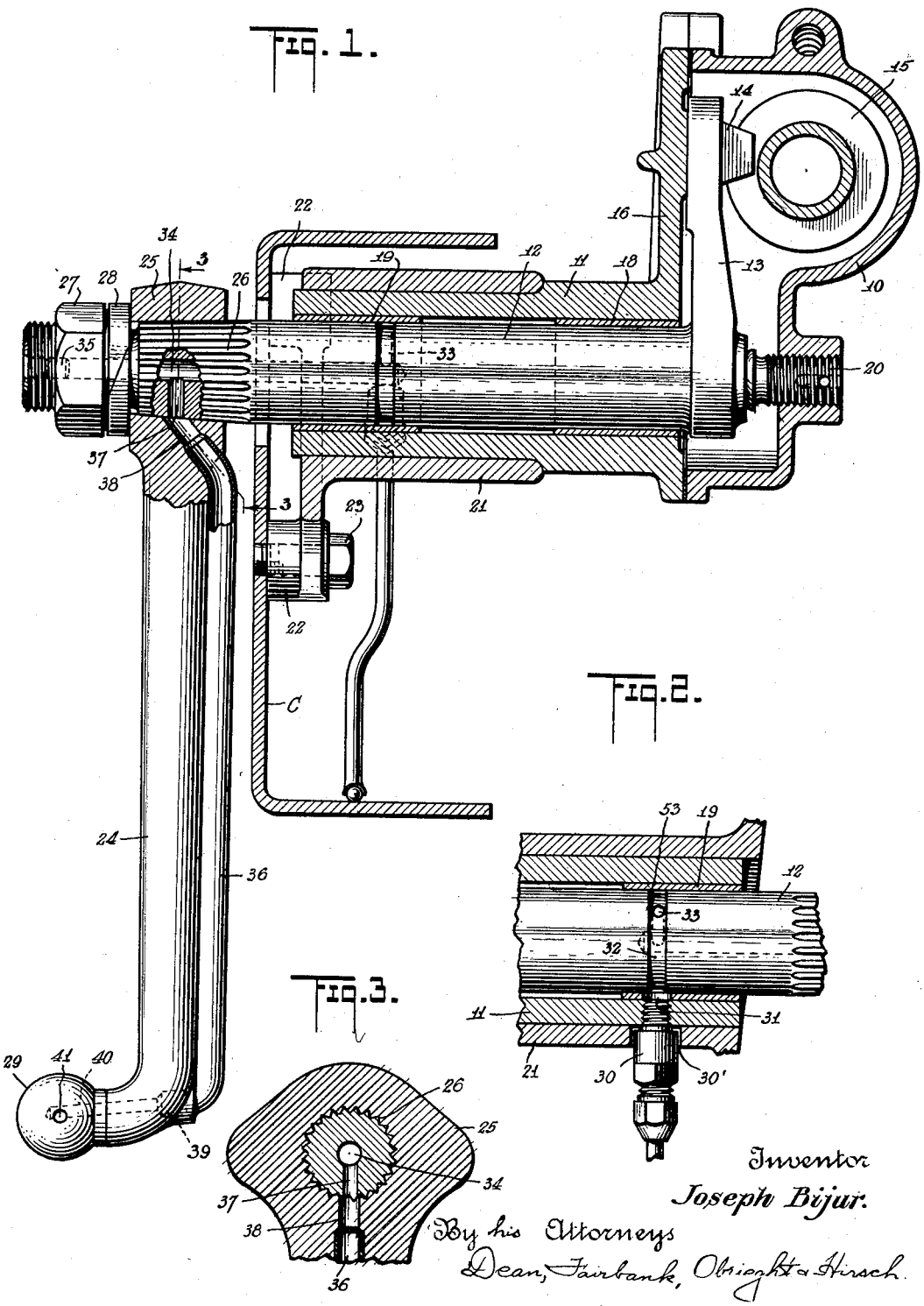

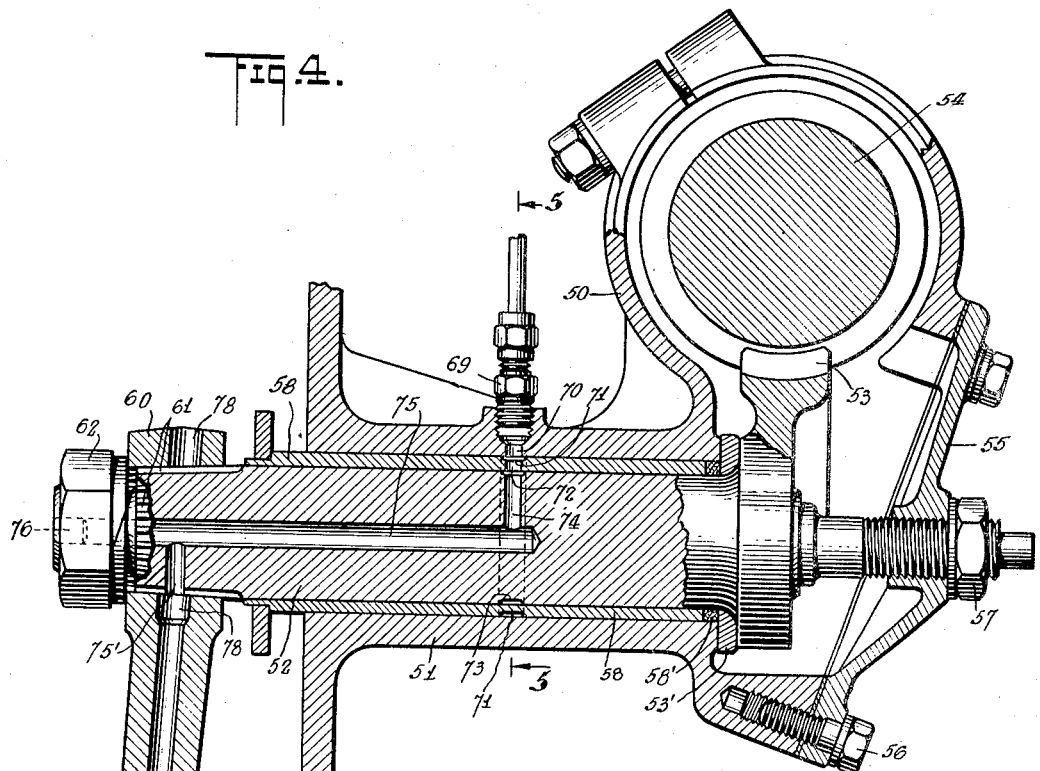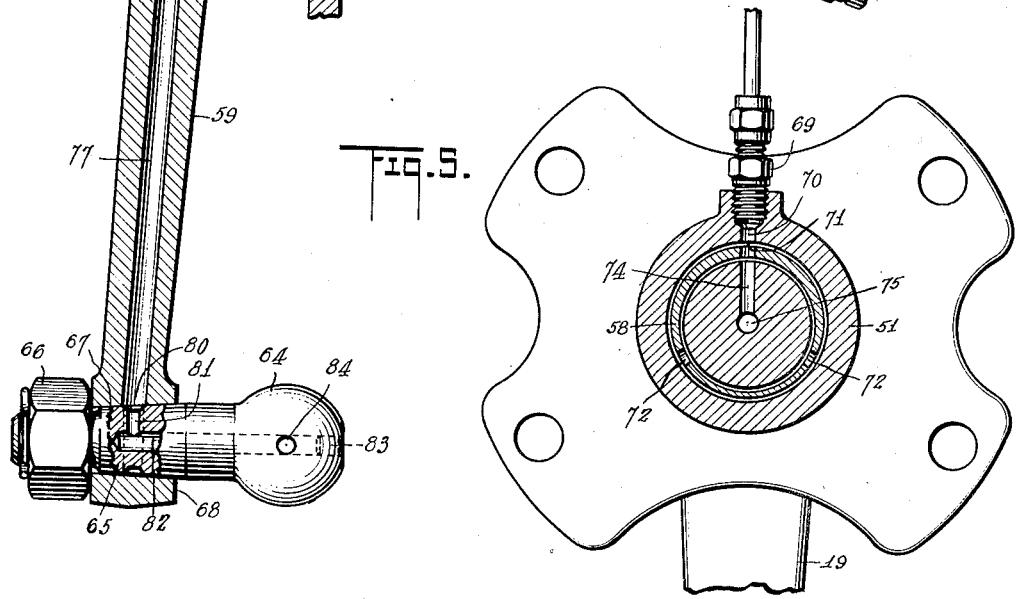

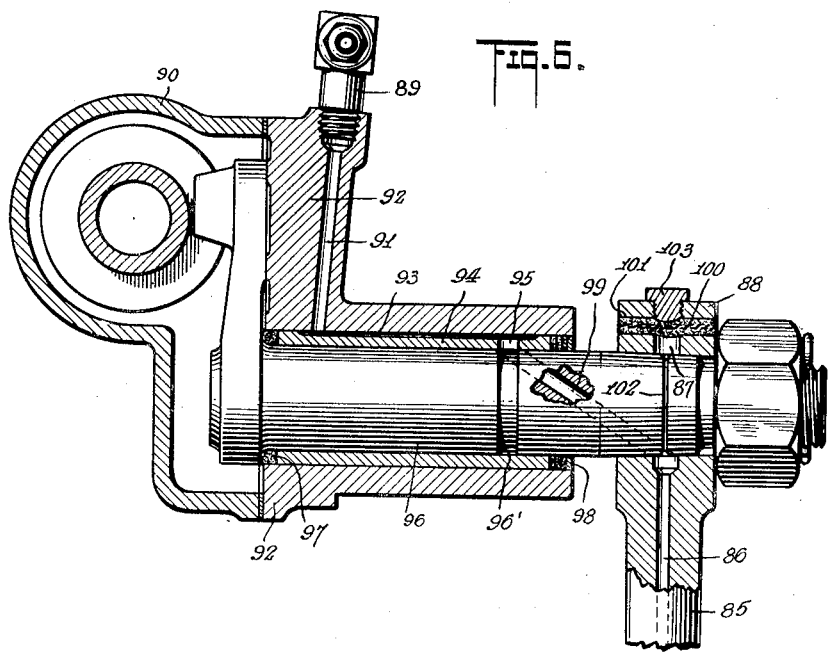
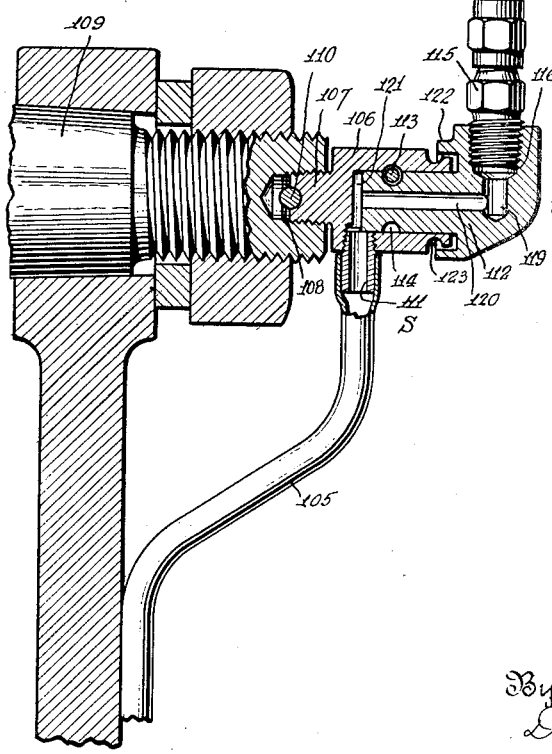
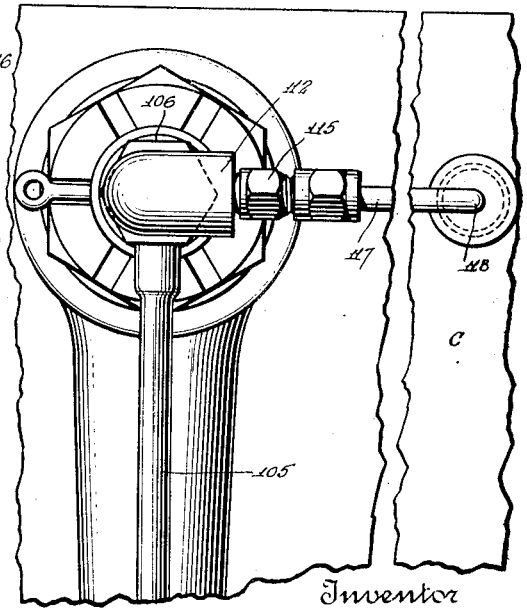

1,948,501

UNITED STATES PATENT OFFICE 1,948,501

LUBRICATING INSTALLATION

Joseph Bijur, New York, N. Y., assignor to Auto Research Corporation, a corporation of Delaware Application February 24, 1928. Serial No. 256,504

37 Claims. (Cl. 184—7)

The present invention is concerned with lubrication and is primarily concerned with methods and installations for lubricating machine or structure elements which move relatively to the main mechanism or machine which is to be lubricated by means of a central system.

The present invention will be illustratively described in connection with a preferred embodiment involving the lubrication of the steering gear of an automobile but it is obvious that many of the features shown, described and claimed will be broadly applicable to other types of mechanisms.

It is among the objects of the invention to provide a simple arrangement for delivering lubricant from the fixed frame of the vehicle to the bearing at the lower end of a depending pivoted arm such as a steering lever, by flow, to be accomplished without stanching or clogging, or entry of dirt or other foreign particles.

Another object is to provide a lubricating arrangement which lends itself readily to steering gear constructions of conventional type, without entailing any substantial modifications thereof, or involving the use of flexible hose or other yielding conduits to accommodate the relative movement of the parts.

Another object is to provide a steering gear of the type noted, the lubrication of which may be conveniently effected from a central system of the types shown in my prior Patents No. 1,632,771, 1,732,212 and 1,746,139 or from any other source of lubricant supply.

As conducive to a clear understanding of the invention, it is noted that where, as is customary in many American makes of automobiles, heavy oil is used in the steering gear case, difficulty is encountered in adequately lubricating therefrom the rock shaft which carries the depending steering arm. This is due to the fact that such heavy oil will not flow into the minute crevice between the rock shaft and its close-fitting bearing sleeve. While a lighter lubricant would readily spread to the rock shaft from the steering gear case, the latter would seen be drained, with consequent injury to the gearing.

On the other hand the use of a looser rock shaft bearing to facilitate flow of heavy lubricant thereto from the steering gear case might result in pounding or in wobbling of the wheels, and in premature loss of lubricant from the steering gear.

It is, accordingly, among the objects of the invention to assure lubrication of a close fitting steering gear rock shaft using the flowing oil, suitable for that purpose, with assurance against the escape of the lubricant from the steering gear housing, whether by ordinary leak or by siphoning.

According to the invention, lubricant for the steering lever is admitted to the rock shaft thereof, from a drip plug or other metering device, for instance, fixed with respect to the stationary part of the bearing and is thence conveyed by gravity flow downward lengthwise of the steering lever, to lubricate the drag-link bearing at the lower end thereof. Preferably, lubricant from the drip plug flows, in part to the rock shaft bearing and in part through a pipe along the length of the steering lever or through a bore through the length of said lever to the drag-link bearing.

In view of the fact that the presence of oil at the usual spline fit of the steering arm renders the connection there air-tight, oil fed from the steering gear shaft would not readily flow down the arm, but, due to its capillarity would spread across the passageway of the steering arm and remain suspended therein.

In order to avoid the arrest of lubricant just mentioned and the consequent siphoning of lubricant from the steering gear housing due to the weight of the column of oil thus arrested after a number of operations, in the descending passageway along the steering lever, it is preferred to prevent, at all times, the creation of a partial vacuum or suction in the said conduit system.

The result is preferably accomplished by the simple expedient of making the pipe or bore along the steering lever, of bore sufficiently large for the major part of the length thereof to permit flow of lubricant about any air therein. Lubricant admitted from the drip plug or other inlet will thus pass by gravity flow through the substantially unvented passage downward along the steering lever without becoming stanched thereat, and, accordingly, also, without siphoning oil from the steering gear housing.

According to another embodiment, the bore or pipe along the steering lever, while made of smaller diameter, too small to permit the flow of lubricant about any air therein, will, nevertheless, not allow oil to become arrested therein, the pipe being vented at a part thereof, relatively inaccessible to dirt, whereby clogging of the vent is rendered improbable.

In another embodiment, lubricant is admitted through a swivel at the outer end of the rock shaft and passes down the steering arm through a pipe or bore entirely out of communication with the rock shaft bearing, but made of internal diameter such as to avoid stanching.

The present application is related to my copending Patents Nos. 1,755,626, 1,755,627 and 1,755,628 and the broader and generic subject-matter is claimed in said copending patents.

In the accompanying drawings in which are shown one or more of various possible embodiments of the several features of the invention, Fig. 1 is a view in longitudinal cross-section showing one embodiment of steering gear equipment, Fig. 2 is a fragmentary detail sectional view showing the location of the drip plug in Fig. 1, Fig. 3 is a fragmentary sectional view taken on line 3—3 of Fig. 1, Fig. 4 is a view similar to Fig. 1 of an alternative embodiment, Fig. 5 is a fragmentary detail sectional view taken on line 5—5 of Fig. 1, Fig. 6 is a fragmentary view similar to Figs. 1 and 4 showing another embodiment of the invention, Fig. 7 is a fragmentary sectional view similar to Fig. 1 of another embodiment, showing the swivel inlet turned through a right angle to better reveal the construction, and, Fig. 8 is a front elevation of the embodiment of Fig. 7.

Referring now to Figs. 1 to 3 of the drawings, I have shown a steering gear of generally conventional construction including a casing 10 which has a protruding bearing 11 for the rock shaft 12 on the end of which is an arm 13 provided with a stud 14 coacting with the worm 15 in the gear case 10.

The cover 16 of the housing 10 is formed integral with the bearing 11 of the rock shaft, which shaft bears in a pair of bushings 18 and 19 near opposite ends of the fixed bearing 11. A screw stud 20 through the housing presses against the end of the rock shaft and prevents rattle. A bracket 21 which encircles the extremity of bearing 11 is secured by means of lugs 22 bolted at 23 against the channel frame C and carries the steering gear assembly.

At the outer end of the shaft 12 is mounted the steering lever 24, the latter having an eye 25 preferably splined at 26 upon the protruding end of the rock shaft and oscillating as a part rigid therewith. A nut 27 threaded upon the extremity of shaft 12 is held by means of a lock washer 28 with respect to the eye 25 of the steering arm to prevent separation of the parts. The drag-link ball bearing 29 is forged as an integral part of the arm 24 at the lower end thereof. The parts thus far described are conventional, and by themselves do not constitute my invention.

The drip plug or other flow control fitting 30 which is passed through an aperture 30′ in bracket 21 supplies lubricant to the bearings other than those in housing 10. The drip plug is threaded into bearing 11 and delivers oil through an aperture 31 in bushing 19. A peripheral groove 32 about shaft 12 registers with aperture 31 and communicates through one or more radial bores 33 in the shaft 12 with an axial bore 34 in said shaft which is plugged at its outer end 35.

Lubricant is conveyed to the drag-link bearing 29 through a pipe 36 lengthwise of the steering arm and draining from a radial bore 37 which in turn communicates with the axial bore 34. Pipe 36 preferably extends at its upper end into a corresponding oblique bore 38 intersecting the eye 25 of the arm. The lower end of said pipe 36 is similarly affixed at a corresponding socket 39 in the lower end of the steering arm. An axial bore 40 and one or more bores 41 radially of the ball end 29 convey the lubricant from the pipe 36 to the drag-link bearing.

A pipe 36 of small diameter would naturally commend itself, not only because it is less conspicuous than a large pipe, easier to handle and cheaper, but also because it involves drilling smaller apertures 38 and 39, and accordingly weakening the steering lever to correspondingly lesser extent.

Yet I have found a small diameter pipe objectionable in operation, for, oil of the grade suitable for chassis lubrication, passing thereinto would form a solid piston and would tend to stay within the pipe by capillary action instead of promptly passing to the bearing. Only after a substantial column of lubricant had thus accumulated in the bore would any lubricant pass on to the bearing, and at that time, all or most of the column would suddenly be released and poured into the bearing.

Moreover, the weight of such collecting column of oil would draw on or siphon oil from the gear housing and such oil, which is especially suitable for the gear housing, would moreover become admixed with the lighter oil admitted through the drip plug 30.

These difficulties are all overcome by the simple expedient of making the bore of the pipe 36 for part or all of its length of diameter so large as to permit the flow of oil about any air in the bore. In practice I have found that a bore diameter of $\tfrac{3}{16}$ inch or more will suffice.

In the construction set forth, the upper end of the steering arm is sealed by the presence of oil at the fit of the eye 25 upon the splined shaft end 26. The ball end 29 having a bore of small diameter, say ⅛″, retains oil therein, which effects substantially an oil seal at the lower end. Thus, the length of pipe along the steering arm is sealed against the admission of dust, dirt or water and incidentally also against the admission of air. While, thus theoretically unvented, the pipe 36 acts nevertheless substantially as an open trough, the oil flowing down about the air imprisoned therein, which remains at all times substantially under atmospheric pressure.

Thus, upon admission of lubricant through the drip plug 30, it passes through aperture 31, groove 32, thence by way of one or two of the radial bores 33 to bore 34 and through bores 34, 37 and 38 to the pipe 36. The oil passes down the pipe 36, the small charge of lubricant proceeding about any air therein and settling on top of any lubricant normally retained in the small bores 40 and 41 of the ball stud, thereby causing a corresponding charge to escape to the drag-link bearing. Thus, the oil admitted to the drip plug promptly reaches the drag-link bearing, and, since it does not form any continuous column in the drooping pipe, no siphoning action upon the lubricant in the gear housing occurs. Some of the oil from the drip plug will spread laterally past the sides of groove 32 and will thereby lubricate the bearing surface of the rock shaft.

Referring now to Figs. 4 and 5 I have shown another type of steering gear also of familiar construction, including a casing 50 which has a protruding bearing 51 for the rock shaft 52 on the end of which is a worm segment gear 53 meshing with the worm 54 on the steering column.

The housing has a cover 55 secured by screws 56, and an abutment screw stud 57 through the cover reacts against the end of the worm segment gear 53 to prevent rattling. The usual bronze bushing 58 sustains the rock shaft 53 and is eccentric as shown to permit by rotary adjustment thereof, the take-up of wear between gears 53 and 54. The steering lever 59 has an eye 60 preferably splined at 61 upon the protruding end of the rock shaft and held thereon by nut 62. The drag-link stud 64 at the lower end of lever 59 has a taper shank 65 clamped by a nut 66 into tight engagement with the corresponding taper wall 67 of the lower eye 68 of the steering arm. The parts thus far described are conventional, and by themselves do not constitute my invention.

A drip plug terminal fitting 69, in the bearing support 51 delivers lubricant to the bearing surfaces, preferably through a port 70 communicating with the peripheral groove 71 about bushing 58, the latter in turn communicating through apertures 72 in the bushing with a groove 73 peripherally about the rock shaft 52. Lubricant is drained through one or more of the apertures 72 into groove 73 thence through a radial bore 74 in the rock shaft into an axial bore 75 plugged at 76 at its outer end. By providing these equidistant apertures 72 in the bushing 58, assurance is had that at least one of these apertures will be in proper position to drain to bore 75, regardless of the particular setting of bushing 58.

From the outer part of bore 75 lubricant is drained through a radial bore 75' in the rock shaft to the steering arm 59. For the latter purpose I have illustratively shown a bore 78 extending through the upper eye of said arm and thence substantially the entire length thereof. This bore is of larger diameter at the eye for facility in drilling and thereby also assuring adequate registry with the somewhat smaller bore 77 in the length of the steering arm.

From the lower end of the steering arm, lubricant is conveyed to the drag-link by way of a peripheral groove 80 about the tight fitting taper stud, which communicates through a radial bore 81 with an axial bore 82 plugged at 83 at its outer end. The axial bore delivers to the drag-link bearing through one or more bores 84 radially of the ball end of the stud.

If the bore 77 were made of diameter so small as to permit the oil to spread thereacross by capillarity siphoning from the gear case 50 would occur, notwithstanding the interposition of a felt washer 58' compressed against the end of bushing 58 by a thrust washer 53' pressed in place by worm wheel 53.

Notwithstanding the fact that the outer end of bore 78 be left open as shown, the oil held at the spline fit 61 will effect an oil seal of the bore 77, which is of diameter $\frac{3}{16}$" or greater, to permit flow of lubricant about the air therein, as in the case of the pipe 36 in Fig. 1.

In Fig. 6 is shown another embodiment in which, while the conduit or bearing of the steering arm is of smaller diameter, so small that lubricant would tend to accumulate in a column therein and to drive out the air ahead of it, I have assured free flow and prevented siphoning from the gear housing by the expedient of venting such drooping conduit, but in a manner, such as to substantially prevent clogging. The steering arm 85 is shown with the longitudinal bore 86 of small diameter as little as ⅛" with which communicates a bore 87 of considerably larger diameter across the upper eye 88. The lubricant for the steering arm is illustratively admitted through a drip plug 89 mounted at the upper part of the housing 90 from which the lubricant passes through a bore 91 in the cover 92 to groove 93 lengthwise of the bushing 94. From the longitudinal groove 93 the lubricant flows through an aperture 95 in the bushing to a groove 96' about the rock shaft 96. Oil spreading laterally from groove 96' lubricates the bearing surface of the rock shaft. To prevent escape of lubricant from beyond the ends of the rock shaft and to prevent interchange of lubricant between the rock shaft and gear housing, gaskets 97 and 98 are compressed against the ends of the bushing 94 about the rock shaft.

An oblique bore 99 through the rock shaft conveys some of the lubricant from aperture 95 to the upper end of the bore 86 in the steering arm. A desirable anti-clogging vent for the upper end of bore 86 comprises a length of wicking 100 fitting into a bore 101 through the thickness of the eye 88 of the lever 85, and above the rock shaft 96. A small groove 102 peripherally about the rock shaft makes venting communication from the bore 86 to the wicking 100. The wicking is centrally clamped in place by means of a plug 103 threaded into the outer end of bore 87. This plug serves the double function of securing the wicking in place, and of locally restricting it to exclude any dirt that may tend to enter from the outer ends of the wicking. The wicking being well above the course of oil flow will not become wet with oil, and will therefore not become oil sealed, which would impair its effectiveness as a vent. While any suitable wicking may be used, I prefer pipe cleaner wicking, which comprises felt strands, centrally clamped between a pair of twisted wires constituting a core therefor.

In operation lubricant admitted through the drip plug 89 will readily flow into and through the length of the steering arm bore 86, since the latter is at all times effffectively vented at its upper end.

In the embodiment of Figs. 7 and 8 the lubricant is conveyed to the drag-link bearing at the lower end of the steering lever without passing through the length of the rock shaft.

In the specific embodiment shown the conduit to the steering lever is located beyond the outer end of the rock shaft and communicates through a swivel construction S with a pipe 105 extending downward along the steering lever. Pipe 105 is of relatively large bore, to prevent stopping of flow, as in Fig. 1.

The swivel embodies a socket member 106 having a solid nipple 107 threaded into a corresponding depression 108 in the extremity of the rock shaft 109 and pinned therein as at 110. Affixed to the socket 106 is the upper end of pipe 105 which is preferably telescoped over the extremity of a short sleeve 111 threaded transversely into the wall of the socket 106 at the base thereof.

The cylindrical plug element 112 of the swivel fits with reasonable security along a substantial length in the corresponding socket 106 and is secured against removal by a cross-pin 113 affixed transversely of the socket member and extending tangentially of a peripheral groove 114 about the plug element. Though the plug element is thus locked against removal, yet the two parts of the swivel can freely rotate relative to each other.

A drip plug 115 or other inlet is threaded into a corresponding depression 116 in the plug element of the swivel and is fed with lubricant through a length of pipe 117 affixed thereto and connected at its opposite end at 118 upon the channel frame C of the vehicle.

The drip plug communicates through a transverse bore 119 in the plug member 112 with an axial bore 120 therein from which the pipe 105 is supplied through the gap 121 intervening between the inner end of the plug 112 and the bottom of socket 106.

To avoid the entry of dust into the swivel the plug element thereof has a flange 122 extending inward to encircle part of the width of a peripheral groove 123 at the exterior wall of the socket member. Dust or dirt to enter the swivelling surfaces would thus have to pass along a circuitous path which it is unlike to do.

In operation it will be seen that the plug element 112 of the swivel will be maintained substantially stationary with respect to the frame by means of pipe 117 while the socket element 106 performs a rocking movement with the rock shaft and steering lever. The swivel operates with little or no friction so that no strain will be imposed in operation upon the pipe, or the swivel.

The rock shaft 109 would in this case be lubricated preferably by a separate and distinct drip plug (not shown).

The lubricating installation of the present invention which is specifically described in connection with the steering gear is also broadly applicable to the lubrication of other chassis elements having a pivotal connection to the chassis frame and having outwardly extending arms from said pivotal element carrying bearings at the ends thereof.

I claim:

1. The combination of a substantially horizontal rock shaft, a support therefor, a depending lever rigid therewith, a bearing at the lower end thereof, a lubricant inlet near said rock shaft, fixed in respect to said support, a passageway communicating therewith and extending longitudinally of said lever to supply lubricant to said bearing, said latter passageway being constructed and arranged to maintain substantially atmospheric pressure therein at all times, thereby insuring prompt delivery to the bearing, of a charge of lubricant admitted at the inlet.

2. A steering gear comprising a bearing, a rocking structure, a depending lever, a lubricant inlet adjacent said bearing, a passageway along said lever supplied from said inlet, said passageway of diameter sufficiently large to permit flow of the lubricant about any air therein and substantially sealed against entry of foreign particles thereto at the upper end thereof.

3. In a lubricating installation, a casing at higher level having lubricated mechanism therein, a rock shaft protruding from said casing, a lever rigid with said rock shaft, an inlet for admitting lubricant to said shaft exteriorly of said casing, a passageway lengthwise of said shaft conveying the lubricant therefrom, a second passageway communicating therewith and extending downward therefrom lengthwise of said lever, said second passageway being constructed and arranged to avoid at all times, the rarefaction of the air therein, whereby in operation siphoning of lubricant to the lower bearing from the casing will be precluded.

4. In a steering gear of the type comprising a gear case having a rock shaft protruding therefrom, a fixed horizontal bearing therefor, a steering lever affixed upon the end of said rock shaft, and a drag-link bearing at the lower end thereof; the combination therewith of a lubricant inlet fitting at said fixed bearing, a longitudinal bore from the outer end of said rock shaft, sealed at its outer end, a radial bore communicating from said inlet to said longitudinal bore, a passageway longitudinally of said lever, closed at its upper end against admission of air, communicating with said bore, and of cross-section sufficiently large to permit the flow of lubricant about any air therein, thereby to assure prompt delivery to the drag link, of lubricant admitted through the inlet and to preclude siphoning from said gear case.

5. In combination with a steering gear of the type comprising a gearing case, a horizontal rock shaft operated from said gearing, a fixed bearing therefor, a steering lever splined upon the outer end of said rock shaft and having a drag-link support at the lower end thereof a gasket at the inner end of the rock shaft to hinder the escape of lubricant from the casing, a lubricant inlet in the fixed bearing part, a bore through the rock shaft communicating with said inlet and out of communication with said casing, a passageway longitudinally of the lever sealed at the upper end, communicating with said bore, leading to said bearing and of diameter sufficiently large for the major part of the length thereof to permit the flow of lubricant about any air therein.

6. In combination with a horizontal rock shaft, a lever splined upon the end thereof and having a bearing at the free lower extremity thereof; a lubricating installation comprising a lubricant inlet at the fixed bearing of said rock shaft, a bore through the end of the rock shaft communicating with said inlet and plugged at its outer end, a passageway longitudinally of said lever communicating with said bore sealed at its upper end against the entry of air and of bore sufficiently large for the major part of the length thereof to permit flow of lubricant about any air therein.

7. A steering gear comprising a gearing case, a horizontal rock shaft driven from said gearing and having a fixed bearing, a steering lever affixed upon the end of said rock shaft, a drag-link bearing at the lower end of said lever, a lubricant inlet at said fixed bearing, a longitudinal bore in said rock shaft supplied from said bearing and a passageway in communication therewith extending longitudinally along said lever to said drag-link and of bore sufficiently large for the major part of the length thereof to permit flow of lubricant about any air therein, the upper end of which is sealed to substantially preclude venting thereof.

8. In combination with a steering gear comprising a horizontal rock shaft, a bearing therefor, a steering lever, and a drag-link bearing carried thereby, said lever being splined upon the end of said rock shaft; a lubricating installation having a bore extending from the upper end thereof to said bearing, a lubricant inlet in the rock shaft bearing, a longitudinal bore through the rock shaft, a plug closing the outer end of said bore, a radial bore communicating from said inlet to said longitudinal bore, a radial bore communicating from said longitudinal bore to the bore in said lever, the open end of the bore in the lever being closed from the external air at the splined mount upon the rock shaft, the diameter of the steering arm bore being sufficiently large to permit the flow of lubricant about any air therein.

9. A steering gear comprising a horizontal bearing, a rock shaft protruding therefrom, a steering lever splined upon the end of the rock shaft, and having a drag-link bearing at the lower end thereof, a lubricant inlet at said horizontal bearing, a conduit along the length of said steering lever, bores in said rock shaft communicating from said inlet to said conduit, said bores comprising a longitudinal bore from the end of said rock shaft and radial bores communicating therewith and respectively in communication with the inlet and with the steering lever conduit, said latter conduit being of bore diameter sufficiently large for flow of lubricant about any air therein.

10. A steering gear comprising a gear casing containing lubricant, a rock shaft operatively connected thereto, a depending lever affixed upon the end of said shaft and having a bearing at the lower end thereof, a fixed bearing for said rock shaft between said gear casing and said depending lever, a lubricant inlet delivering at said fixed bearing, a passage extending longitudinally of said lever conveying lubricant from said inlet to said lower bearing and means for preventing lubricant from the gear casing passing into said fixed bearing.

11. A steering gear comprising a gear casing containing lubricant, a rock shaft operatively connected thereto, a depending lever affixed upon the end of said shaft and having a bearing at the lower end thereof, a fixed bearing for said rock shaft between said gear casing and said depending lever, a lubricant inlet delivering at said bearing, a passage extending longitudinally of said lever conveying lubricant from said inlet to said lower bearing and means to prevent lubricant which has passed said inlet from flowing into said gear casing.

12. A steering gear comprising a gear casing containing lubricant, a rock shaft operatively connected thereto, a depending lever affixed upon the end of said shaft and having a bearing at the lower end thereof, a fixed bearing for said rock shaft between said gear casing and said depending lever, a lubricant inlet delivering at said bearing, a passage extending longitudinally of said lever conveying lubricant from said inlet to said lower bearing and a compressed gasket between said fixed bearing and said gear casing adapted to prevent lubricant exchange therebetween.

13. A steering gear comprising a horizontal rock shaft having a fixed bearing, a steering lever firmly fixed upon the end of said shaft, a lubricant inlet at said fixed bearing and a passageway longitudinal of said steering lever, said passageway for part of its length being of sufficient width to permit the reverse passage of air and oil and at its end adjacent the lower end of the lever being of insufficient width for this purpose.

14. The arrangement of claim 13 in which the passageway at its lower end is not of greater width than 1/8" and above its lower end is of 3/16" width or larger.

15. A steering gear comprising a horizontal bearing, a rock shaft included therein and protruding therefrom, a steering lever rigidly attached to the end of said rock shaft, a horizontally projecting ball stud drag-link bearing at the lower end of said steering lever with a plurality of bearing surfaces, a lubricant inlet at said horizontal bearing, a substantially horizontal conduit along said horizontal bearing, a substantially vertical conduit communicating with said horizontal conduit along the length of said steering lever and a second substantially horizontal conduit communicating with said vertical conduit and extending into the ball stud and radial conduits in said ball at right angles to said last mentioned horizontal conduit and communicating therewith; lubricating said ball stud bearing surfaces, one radial conduit being provided for each bearing surface.

16. A steering gear comprising a horizontal bearing, a rock shaft included therein and protruding therefrom, a steering lever rigidly attached upon the end of said rock shaft, a horizontal ball stud drag link bearing extending outwardly from the lower end of said steering lever, a lubricant inlet adjacent the top of said lever, a vertical conduit extending vertically downwardly for the length of said lever, a horizontal bore through said ball stud communicating with said vertical conduit, a plug in the outer end of said bore and radial bores in said ball of ball stud at right angles to said first mentioned bore and adapted to supply lubricant to the bearing surfaces of said ball stud.

17. A steering gear of claim 16 in which the ball stud has two bearing surfaces at the front and back thereof which contact with the drag link and in which there are two radial passages, each extending to one of the bearing surfaces from the center of the ball of the ball stud.

18. In combination with a lubricated steering gear provided with a rock shaft with lubricant passages and with a lubricant outlet at the place of connection to the steering lever, a unitary lubricated steering lever assembly consisting of an arm, a lubricant conduit associated with and extending longitudinally of said arm, an inlet to said conduit rigidly associated with said arm adjacent to its point of connection to the rock shaft and an outlet from said conduit rigid with the other end of said steering arm, said conduit being installed consequent to installation of said arm and being removed consequent to removal of said arm.

19. A lubricated steering gear comprising a horizontal bolt forming an upper bearing element, a depending lever attached to the end of said bolt, a ball stud bearing at the lower end of said lever, a sleeve encircling said bolt, an inlet associated with said sleeve, a longitudinal passage communicating with and extending from below said inlet to the end of the bolt to which the depending lever is attached, a plug in said bore at the end of the bolt, a transverse bore through the bolt at the place of attachment of the depending lever, a second bore in the end of said lever adjacent the place of attachment communicating with said transverse bore, a longitudinal bore through said ball stud and a conduit connecting said two last mentioned bores.

20. In combination with a lubricated steering gear arrangement comprising a rocking structure including a horizontal bolt forming an upper bearing element and a depending lever attached to the end of said bolt provided with a bearing at its lower end, a lubricant inlet adjacent to said horizontal bolt and a lubricant conduit system for conveying the lubricant to the lower bearing consisting in part of bores in each end of the lever.

21. A steering gear comprising a rock shaft, a fixed bearing therefor, a depending lever affixed upon the end of said shaft and having a bearing at the lower end thereof, a lubricant inlet delivering at said fixed bearing, a passage longitudinally of said lever conveying lubricant from said inlet and said fixed bearing to said lower bearing, and a dust excluding vent for the upper end of said passage.

22. A steering gear comprising a horizontal rock shaft having a fixed bearing, a steering lever firmly affixed upon the end of said shaft, a lubricant inlet at said fixed bearing, a passageway longitudinally of said steering lever, a bore through said rock shaft establishing communication between said inlet and the upper end of said passageway, and a dust excluding vent for said passageway at the upper end of said lever.

23. In a steering gear, the combination of a horizontal bearing, a rock shaft therein and protruding therebeyond, a steering lever having an eye tightly affixed over the protruding end of said rock shaft, a bore through said eye, a passageway in communication with said bore and longitudinal of said lever, an oil supply passageway obliquely of said rock shaft communicating with the passageway of said lever, and having an inlet at a part fixed with respect to said bearing, a narrow groove about said rock shaft and means cooperating with said groove for establishing substantially dust excluding vent communication to the steering lever passageway.

24. A motor vehicle frame having a downwardly extending lever pivoted thereto with a bearing at the lower end of said lever, a lubricant inlet at a fixed part of said frame in the vicinity of said lever, said lever having a conduit of small bore lengthwise thereof leading to said bearing, said inlet communicating with said conduit, said lever having an opening near the upper end thereof through which the upper end of said conduit is vented and dust excluding closure means for said vent affording a multiplicity of minute venting openings, a conduit being provided between said inlet and said conduit to establish communication therebetween.

25. In a motor vehicle, the combination of a pivoted steering lever having a mounting eye at one end and a bearing at the other, and having a conduit of small bore leading lengthwise from said eye to said bearing, said eye having a bore through the wall thereof communicating with said conduit, and a filler in said bore, affording a multiplicity of minute venting openings.

26. In a steering gear, the combination of a rock shaft, a fixed bearing therefor, a depending lever having an eye affixed to said shaft and having a bearing at the lower end thereof, said lever having a bore of small diameter extending from said eye to said bearing, a lubricant inlet fixed relative to said fixed bearing, said rock shaft having a conduit establishing communication between said inlet and said bore, a narrow groove about the rock shaft within the eye in registry with said bore, a transverse bore through said eye above said rock shaft and communicating with said groove, a length of wicking in said bore and a plug in the upper end of said eye clamping said wicking in place.

27. In a steering gear, the combination of a rock shaft, a steering lever affixed to the end thereof for rocking therewith, a lubricant passageway extending downward along the length of the steering lever, the upper end of said passageway being rigidly mounted with respect to said rock shaft and a lubricant inlet conduit having its outlet part securely affixed with respect to said swivel member, said swivel member having an elongated bearing surface, with respect to the upper end of said passageway, whereby it will remain stationary in operation and allow the rock shaft to move with respect thereto.

28. In a steering gear of the type embodying a rock shaft and a steering lever splined thereto; the combination therewith of a swivel socket member having a nipple firmly secured into the extremity of the rock shaft and coaxial therewith, a pipe having its upper end in free communication with said swivel socket, and extending downward along said steering lever to the drag-link bearing, a swivel plug member having an elongated bearing within said socket member, means to maintain the constituent parts of said swivel from separation, an inlet conduit having an outlet fitting secured to said swivel plug member, said swivel having oil conduits therethrough for conveying lubricant from said supply conduit through the swivel to the pipe and drag link bearing.

29. In a chassis lubrication system, the combination of a swivel member comprising a socket member having a mounting nipple, a cylindrical plug having a snug elongated bearing surface in said socket, a pin through said socket extending tangentially of a corresponding peripheral groove about said plug, said plug having a lubricant inlet and said socket a lubricant outlet, said inlet and outlet in communication with each other through a passageway in said plug.

30. A steering gear comprising a horizontal rock shaft, a bearing therefor, a steering lever having an eye affixed upon the protruding end of said shaft, a conduit of small bore longitudinally of said lever, and extending transversely of said eye, and a small groove about said rock shaft, establishing vent communication between the outer end of the bore and the conduit of the steering lever.

31. In a steering gear, the combination of a lubricant retaining casing having gearing therein, a fixed bearing protruding from said casing, a rock shaft in said bearing and protruding therebeyond, a lubricant inlet at said bearing communicating with the wear surface thereof, gaskets at the ends of said bearing, a steering lever tightly affixed upon the protruding end of said shaft, a bore through the length of said steering lever, leading to the drag link bearing, an oblique bore from said rock shaft, sloping down from the upper part of said rock shaft to the lower part of the rock shaft, and a small groove about said rock shaft establishing dust excluding venting communication to the bore of said steering arm.

32. In combination with a substantially horizontal rock shaft, a depending lever rigid therewith and a bearing at the lower end thereof; a lubricating installation comprising a fixed lubricant inlet near and above said rock shaft, a passageway initiating at the bottom of said rock shaft diametrically opposite and longitudinally removed from said inlet extending longitudinally of said lever to supply lubricant to said bearing, and a system of interior conduits from said inlet to the upper end of said passageway, consisting in part of conduits transverse to the rock shaft axis and along said rock shaft axis, said passageway being constructed and arranged to maintain the air therein at substantially atmospheric pressure therein at all times, thereby insuring prompt delivery to the bearing, of a charge of lubricant admitted at the inlet.

33. The combination with a steering gear, a rocking structure including a rock shaft and a depending lever attached to the end of said rock shaft, and provided with bearings at the top and bottom of the rocking structure, of a lubricating installation including a lubricant inlet at the top bearing and a conduit connecting said bearings feeding lubricant from the top to the bottom bearings, said conduit being protected by and inside of the body of said lever.

34. A lubricated steering gear construction comprising a rocking structure with a horizontal bolt and a depending lever from the end thereof, a bearing sleeve enclosing said bolt, a rotatable adjusting bushing between said bearing sleeve and said bolt, said bushing being rotatable only during adjustment, an inlet fitting attached to said bearing sleeve, grooves at the outer surface of said bushing and at the outer surface of said bolt, completely encircling said bushing and said bolt, the groove in said bushing communicating with said inlet fitting and a series of radial passageways through said bushing permitting a lubricant communication between the groove in the bushing and the groove in the bolt.

35. In a lubricating installation, a casing at higher level having lubricated mechanism therein, a rock shaft protruding from said casing, a lever rigid with said rock shaft, an inlet exteriorly of said casing to supply lubricant to the casing, a passageway extending in the direction of said shaft conveying the lubricant from the inlet, a second passageway communicating with the said first mentioned passageway and extending downward from said first passageway lengthwise of said lever, said second passageway including means to avoid at all times, the rarefaction of the air therein, whereby in operation siphoning of lubricant to the lower bearing from the casing will be precluded.

36. In combination with a substantially horizontal rock shaft, a support therefor, a depending lever rigid therewith and a bearing at the lower end thereof; a lubricating installation comprising a lubricant inlet near and above the axis of said rock shaft, fixed in respect to said support, a passageway initiating at the bottom of said rock shaft diametrically opposite and longitudinally removed from said inlet extending longitudinally of said lever to supply lubricant to said bearing, and a system of interior conduits from said inlet to the upper end of said passageway, consisting in part of conduits transverse to the rock shaft axis and extending in the direction of the axis, said passageway being provided with means to maintain the air therein at substantially atmospheric pressure therein at all times, thereby insuring prompt delivery to the bearing, of a charge of lubricant admitted at the inlet.

37. The combination with an automobile chassis having an enclosing member provided with a cylindrical bearing cavity and a pivot member partly enclosed and bearing in said cavity, said pivot member and said enclosing member having a rocking bearing in respect to each other, an arm extending outwardly from said rocking bearing, and carried by one of said members of said rocking bearing, said arm carrying a bearing at its outer end; of a lubricating installation including a lubricant inlet positioned at and being rigid in respect to one of the members of said rocking bearing, not carrying said arm, a conduit system carried by said other member leading to the outer bearing on said arm, and a swivel connection between said inlet and said conduit located at the end of said pivot member, said swivel connection including telescoping elements one rigidly connected to one of the members of said rocking bearing and the other to the other member, means to hold said members in permanently telescoped relationship, said members being each provided with intercommunicating lubricant passageways, the inlet end of one of which is directly connected to said lubricant inlet and the outlet end of the other of which is directly connected to the inlet end of said system, one of said telescoping members taking the form of a cup-shaped member rigidly connected to the pivot member and the other taking the form of a cover member for said cup-shaped member with a nipple portion projecting into said cup.

JOSEPH BIJUR.